Dec. 20, 1927.
A. N. BENN
1,653,539
SMOKEHOUSE TROLLEY
Filed Dec. 8, 1926
3 Sheets-Sheet 1
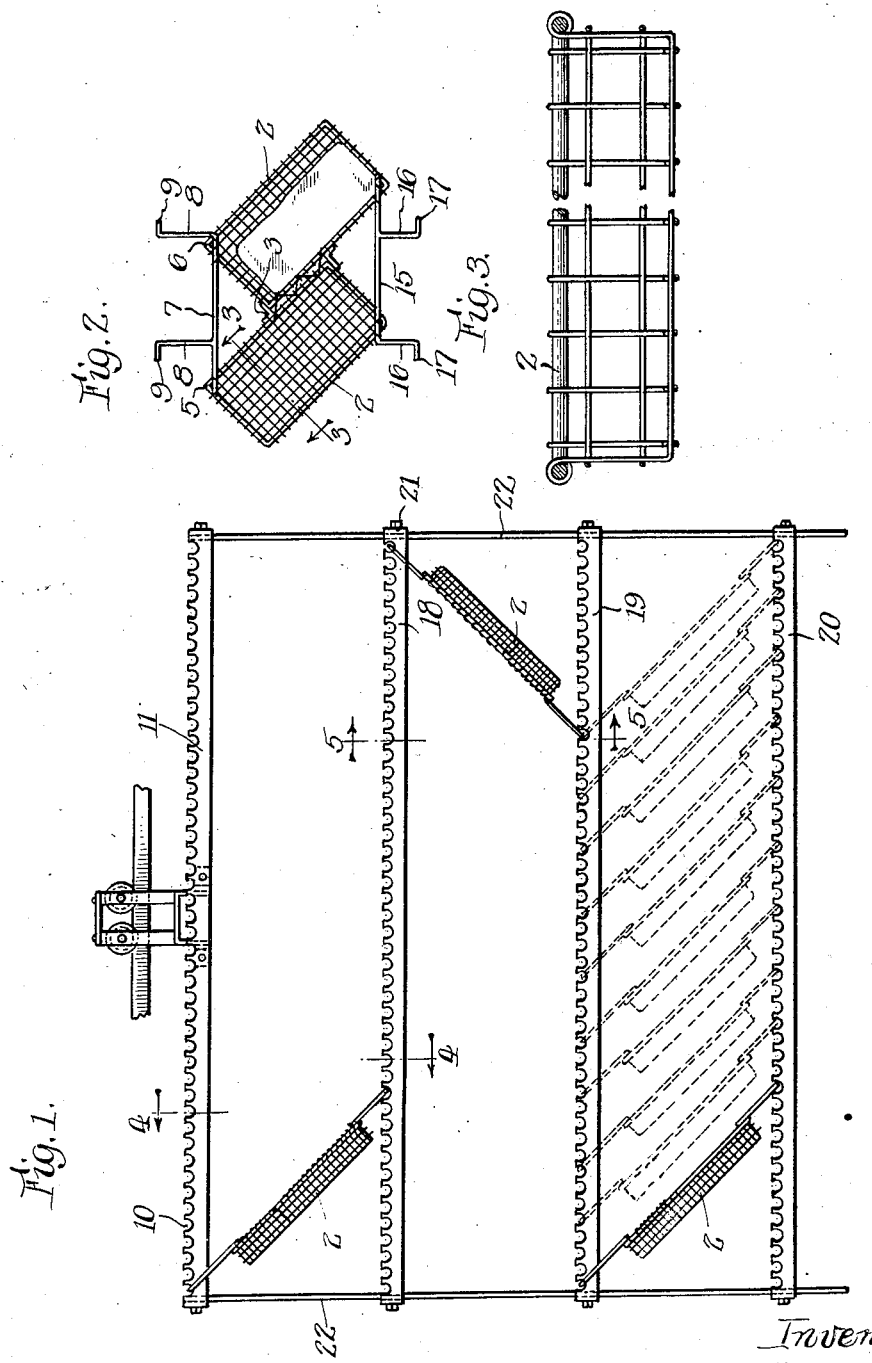
Inventor:
Alonzo Newton Benn,
By W. E. Williams
Atty.

Dec. 20, 1927.
A. N. BENN
1,653,539
SMOKEHOUSE TROLLEY
Filed Dec. 8, 1926
3 Sheets-Sheet 2
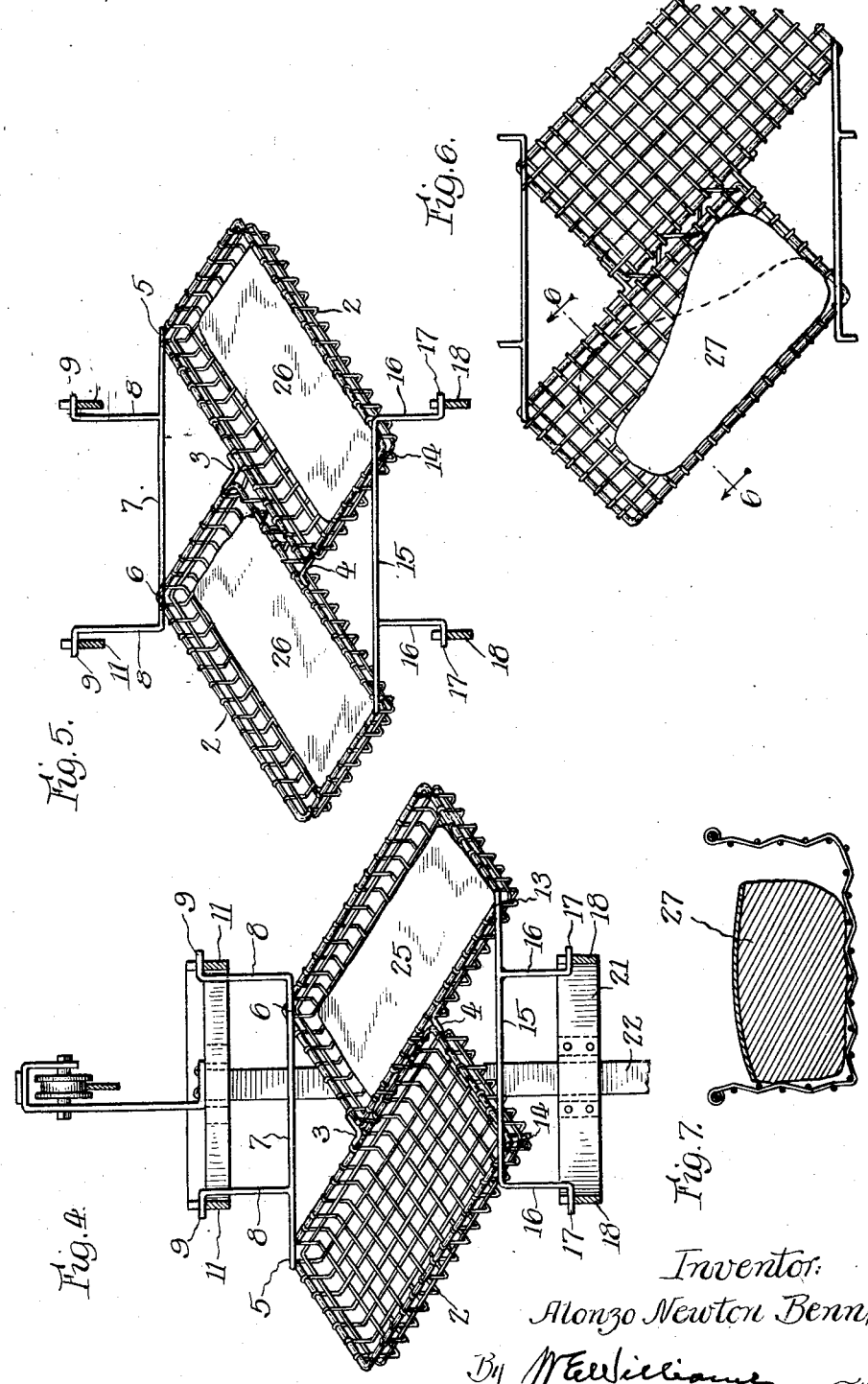
Inventor:
Alonzo Newton Benn,
By W. E. Williams
Atty.

Dec. 20, 1927.
A. N. BENN
1,653,539
SMOKEHOUSE TROLLEY
Filed Dec. 8, 1926
3 Sheets-Sheet 3
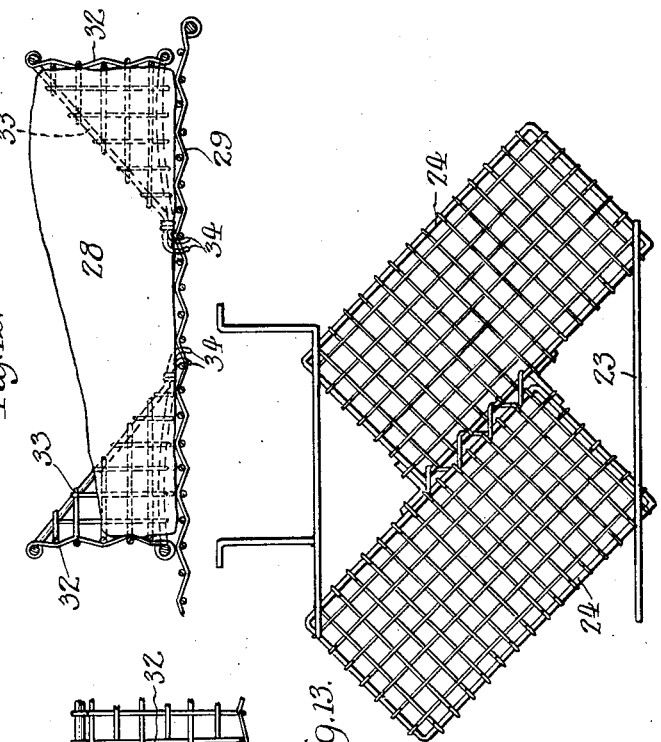
Inventor:
Alonzo Newton Benn,
By W. E. Williams
Atty.

Patented Dec. 20, 1927.

1,653,539

UNITED STATES PATENT OFFICE.

ALONZO NEWTON BENN, OF CHICAGO, ILLINOIS.

SMOKEHOUSE TROLLEY.

Application filed December 8, 1926. Serial No. 153,406.

My invention relates to a peculiarly arranged trolley wherein the meat, when entered in a relatively soft state, is supported in a form to control its shape during the smoking and handling of the meat wherein the meat takes on a form which becomes more or less permanent due to the means of holding and supporting it in the trolleys while the same is being smoked and treated and the object of my invention is to provide a means for holding the meat, particularly hams and bacon and similar cuts, in a form that will cause them to assume the shape of a particularly desired form of the cuts of meat for marketing which shape effects an economy in the slicing and handling of the meats in being prepared for consumption.

In the handling of bacon in smoke houses it has been more or less the general practice heretofore to hang the same upon hooks which are mounted in frames supported on trolley wheels on elevated tracks and thus, when meat is being placed in the trolleys preparatory to being treated by the smoking process, the operators take each separate piece of bacon or other similar meat and by hand forcibly presses it on a series of hooks which piece, thus supported, hangs downward during the smoking process and the weight of the suspended meat acts to draw down the body of the piece and, as it were, narrow the width from the normal width of the piece as held by the hooks at the top. These hooks in the case of bacon are somewhat close together and extend across the entire end of the piece of bacon. By the terms hook I mean any straight spikes or pins adapted to hold the meat. While these hooks are clean when the meats are first applied thereto the feature of supporting the meat by the hook tends, as it were, to elongate or deepen the width of the hole leaving sometimes quite a little void below the actual metal of the hooks or spikes that extend into the meat and in the smoking process there accumulates some of the carbon of the smoke into these apertures so that, when the meat is removed, there is more or less of a disfigured or damaged feature on the end where the piece of meat was supported by the hooks or spikes on which it has been impaled on the trolley. With my trolley, meat is so held that no damage of like character occurs as does occur when the meat is suspended on hooks as just described.

Reference will be had to the accompanying drawings of which Fig. 1 is a side elevation of a packing house smoke house trolley frame of a form common in use arranged with my invention of the holding baskets for several pieces of meat.

Fig. 2 is a plan sectional view of the baskets and their fixtures in which I hold the meat in the trolley frame as indicated in Fig. 1.

Fig. 3 is a transverse sectional view on a larger scale of one of the baskets on line 3—3 of Fig. 2.

Fig. 4 is a transverse elevational view on line 4—4 of Fig. 1 showing one set of my baskets.

Fig. 5 is a similar view to that of Fig. 4 on line 5—5 of Fig. 1 showing another tier of baskets oppositely arranged to that shown in Fig. 4.

Fig. 6 shows a similar set of baskets to that represented in the other figures, the difference being in the depth of the basket which adapts them to carry thicker pieces of meat than what are shown in the previously mentioned figures, the former figures relating chiefly to bacon while the baskets of Fig. 6 are adapted for hams and thicker pieces of meat than bacon.

Fig. 7 is a transverse sectional view on line 7—7 of Fig. 6.

Fig. 8 shows a plan sectional view of one shelf of a trolley and holding means adapted to hold what are known as boneless hams or picnics as compared with bacon and hams shown in figures previously mentioned.

Fig. 9 is a transverse sectional view on line 9—9 of Fig. 8 but on a larger scale than that shown in Fig. 8.

Fig. 10 is a perspective view of part of the holding means as shown in Figs. 8 and 9.

Fig. 11 is an elevational detail sectional view showing the means of holding to the trolley shelf the apparatus shown in Fig. 10.

Fig. 12 is a transverse sectional view of a trolley shelf showing a modification from that employed as shown in Fig. 9.

Fig. 13 shows a modified form of a set of baskets of the general type shown in Figs. 1–6 inclusive, the modification relating to the rods which are employed at the ends of the baskets to support the lower ends of the baskets in the trolley frame.

In cutting the meat for bacon, this part of the animal composes the belly portion and in the first steps of cutting the carcass it is cut centrally down to the middle of the belly. This portion of the carcass is also soft and while the cutting of this portion is intended to be straight and even this main slit of cutting open the body of the carcass shows more variation from a true line than does the other cutting which cuts the bacon pieces across or along the dividing line of what are termed the loins. As a general statement the upper portion of the body of the bacon contains more fibrous material while sometimes it may be fatty as well and thus the upper portion of the ends of the pieces of bacon are more uniform and retain their shape better than does the portion of the bacon which forms the central or body line of the belly portion. It is desirable in holding the meat to line up the slabs of bacon in holding means so that they will take on as regular lines as possible during which time setting takes place in smoking or other treatment given the meat. To bring this about in the handiest and most convenient way, I provide, for bacon, a series of baskets slightly deeper than the thickness of the bacon, these baskets being indicated by 2 and are arranged together in pairs of two on diagonal lines being secured together at 3 and 4 and making, as it were, a single unitary basket having two compartments and these baskets are also connected at their upper and lower corners at 5 and 6 to cross rods 7 and 15 which rods have projecting legs 8 and lower ones 16 and turned over trunnion ends 9 and 17, these ends being adapted to rest in the notches 10 in the bars 11 of the ordinary commonly used trolley for general purposes of holding meat of various kinds.

The shape of the rods 7 and 15 and their connections to the baskets are substantially the same so that the rods at each end and the baskets themselves form, as it were, a unitary member which may be hooked into the trolley frame either end up, as may be desired, the fastening of the rods 7 and 15 being welded or immovably fixed to the corners of the baskets at the points 5, 6, 13, and 14 so that the baskets, rods, and trunnions 9 and 17 are handled as a single unit of fixed together pieces retaining their shape and association in the handling and thus permitting, as it were, the shifting of these baskets in and out of the carrying trolleys as may be desired in the service of using them for holding the meat; the carrying trolley itself being composed of the side bars 11, 18, 19 and 20 as may suit the maker or user of such apparatus and these side bars are connected by end cross bars 21 and these bars are connected together by vertical end bars 22 thus forming the ordinary trolley to which my baskets are mounted as desired.

I may, as desired, economize in the space occupied in the trolley and make my baskets a little larger by constructing them as indicated in Fig. 13 in which the upper ends of the baskets are provided with rods substantially like the rods 7 and its parts as shown in Fig. 4 but the bottom rod 23 in the instance of Fig. 13 is substantially a straight rod resting directly into the notches 10 of the bars 18 and 19 without the use of the projections 8 and 16 of the rods 7 and 15 as shown in Fig. 4. By this means I make the baskets 24 themselves shown in Fig. 13 a little larger as will be understood by its saving the length of the projections 16 as shown in Fig. 4. However, in the forms shown in Fig. 13 the baskets must always be hung in the trolley with the rod 23 down whereas with the other trolley either end of the basket fastening may be used upward or downward as suits the convenience of the person using the device. The convenience of using the form shown in Fig. 4 lies in the fact that the operator is not required to turn the baskets around in assembling them as relates to the different shelves of the trolley as best understood from the position shown in Fig. 1 whereas with the use of the basket shown in Fig. 13 the operator may be compelled to reverse or turn them around as relates to the placement on each different shelf.

The baskets 2 being arranged in diagonal lines as relates to their length and then being supported in the carrying trolley at inclined positions as shown in Fig. 1 to bring about the incline of the baskets so that the gravity action of anything placed on the bottom of the basket acts to slide down to the lower end and side or when any article is placed at these lower ends or sides gravity holds it in such a position. The bacon is cut as previously mentioned herein and is formed, as it were, of right and left slabs which is brought about by the fact that the bacon is cut from both sides of the belly and thus the irregular side comes, as it were, in right and left pieces. In Fig. 4 the slab of bacon is indicated by 25, placed in one of the baskets with the irregular edges pressed up against the lower side and the lower end of the basket by the operator in a manner to straighten more or less the piece of meat conformed to the straight side and end of the basket.

In Fig. 5 the baskets are arranged to receive what might be termed the piece of bacon cut from the other side of the belly from what is placed in the basket as shown in Fig. 4. The bacon in Fig. 5 is indicated by 26 having the corresponding irregular edges lined up on the lower sides and edges of the baskets. In loading the baskets in the trolley frames and the meat in the baskets, the habit is to arrange one tier of baskets to accommodate the bacon cut from one side of the belly and with the next tier of baskets with the bacon cut from the other side of the belly and thus the operator will fill one tier by putting in a single basket unit at a time beginning at the end of the trolley and filling that side of the baskets and then placing in the next basket, filling in and so on until that particular tier of the trolley has been filled. Then the next tier will be arranged at an angle in the reverse direction as may well be understood by Fig. 1. When baskets are required for use of hams the baskets are made deeper than those required for bacon. These baskets are indicated by Figs. 6 and 7 wherein 27 indicates a ham. The usual practice thus employed is to square up the butt end and place the irregular side of the ham in the downward ends of baskets as indicated by full lines in Fig. 6. The dotted lines in Fig. 6 indicate a reverse position as may be used in some instances to shorten up the shank of the ham by having the main weight of the body of the ham hold the shank in a shorter position than the normal length of the same whenever the position of the bone may permit such a distortion of shape.

Certain classes of hams and pieces of meat called picnics or picnic hams and other meat have the bone removed and are wrapped and corded in shape nearest to that which is desired for marketing and such pieces of meat are shown in Fig. 8 and indicated by 28 and the trolley employed in handling these pieces of meat may be that of an ordinary trolley shelf having flat level bottom as compared with the standard trolley made of bars as indicated in Fig. 1. The screen bottom is indicated in Fig. 8 as 29 and such trolleys are in common use having nothing but a flat shelf of screen material. However, I provide, as desired in some instances, a trolley shelf for certain classes of meat having a screen bottom and screen sides and ends, the bottom being shown as 29 as previously mentioned and the side walls 30, Figs. 8 and 9 and thus the shelf becomes, as it were, a basket having a bottom and side walls onto which the pieces of meat 28 are placed having their shank ends pressed up against the screen side walls as indicated by 31 as these pieces of meat having no bone are more or less soft and may be pressed to some extent into the desired shape. The pressing of the shanks of the butt against the side walls and the pressing of the butt into shape are for the purpose of giving square and neat ends better adapted to slicing than if the meat were allowed to lie without being held in shape. To provide a squaring up for the butts of the pieces of meats, I provide brackets having adjustable end wall pieces 32 as shown in Fig. 10, side wings 33 terminating in hooks 34 adapted to be secured into the mesh of the bottom screen 29 and adjusted to press up snugly against the butts 35 with the pieces of meat as shown in Fig. 9.

In adapting screen shelves already in service in packing house smoke house trolleys which screen shelves have not the side walls 30 I provide a double set of brackets shown in Fig. 10 and arrange them as indicated by Fig. 12 one for each end of the piece of meat 28. Thus by the said brackets I am enabled to use some of the apparatus already in service with other pieces of meat.

The word "trolley" is commonly used in connection with these devices for carrying meat in various ways through the packing houses as relates to the track and rollers and the means supported thereby which carries the products around through the different services of the packing houses. However, the invention herein described relates more to the means of actually carrying the meat whether it is by a trolley hung from the frame or supported on wheels on a track on the floor or by any other means of transport or carriage, the principal feature being the means for holding the meat as indicated in positions adapted to secure the desired shape results and while the term "trolley" is used in this connection, it is used as desired to be understood in the interpretation of the specification and the claims and relating to the mechanism involved for the carriage for the purpose of holding the meat in form.

What I claim is:

1. In mechanism of the class described, a smoke house trolley frame provided with shelves for holding the meat, the bottoms of said shelves set at an angle as relates to the force of gravity and said bottoms provided with side walls also located at an angle in relation to the direction of gravity by which the meat is induced by gravity to lie against the bottom and side walls.

2. In mechanism of the class described, a supporting trolley frame work, shelves for holding the meat sustained in the said framework and having two walls inclined in opposite directions to each other and with the apex of the walls being at the bottom.

3. In mechanism of the class described, a carrying frame, a series of detachable shelves mounted in the frame, said shelves composed of a plurality of baskets rectangular in outline and having side walls and flat bottoms and arranged to be mounted in the framework with a corner of the baskets located in a downward inclined position and the bottoms of the baskets located at an incline.

4. In mechanism of the class described, a framework adapted to carry meat in the smoking process, a series of detachable shelves adapted to be supported in the said framework in a series of tiers one above the other and arranged to be set in inclined positions in the said shelves one set in one tier inclined in one direction and a companion set in another tier inclined in a reverse direction.

Signed at Chicago, in the county of Cook and State of Illinois this 7th day of Dec. 1926.

ALONZO NEWTON BENN.